United States Patent
Fukuda

(10) Patent No.: US 10,181,182 B2
(45) Date of Patent: Jan. 15, 2019

(54) IMAGE PROCESSING APPARATUS AND IMAGE PROCESSING METHOD FOR ESTIMATING POINT SPREAD FUNCTION

(71) Applicant: SONY CORPORATION, Tokyo (JP)

(72) Inventor: Kazumi Fukuda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 51 days.

(21) Appl. No.: 15/128,355

(22) PCT Filed: May 20, 2015

(86) PCT No.: PCT/JP2015/064404
§ 371 (c)(1),
(2) Date: Sep. 22, 2016

(87) PCT Pub. No.: WO2015/186511
PCT Pub. Date: Dec. 10, 2015

(65) Prior Publication Data
US 2017/0161883 A1    Jun. 8, 2017

(30) Foreign Application Priority Data

Jun. 3, 2014    (JP) ................................ 2014-114628

(51) Int. Cl.
G06T 5/00    (2006.01)
G06T 5/20    (2006.01)
G06T 5/10    (2006.01)

(52) U.S. Cl.
CPC ................ *G06T 5/20* (2013.01); *G06T 5/001* (2013.01); *G06T 5/003* (2013.01); *G06T 5/10* (2013.01);
(Continued)

(58) Field of Classification Search
CPC .. G06T 5/001; G06T 5/10; G06T 5/20; G06T 2207/20021; G06T 2207/20052; G06T 5/003
See application file for complete search history.

(56) References Cited

U.S. PATENT DOCUMENTS

2003/0091243 A1*   5/2003   Sasada ...................... G06T 5/10
                                                       382/260
2005/0271274 A1*   12/2005   Urano .................. G06T 11/001
                                                       382/173
(Continued)

FOREIGN PATENT DOCUMENTS

JP    2009-225211 A    10/2009
JP    2010-198599 A    9/2010
(Continued)

OTHER PUBLICATIONS

Yuan et al. ("Image deblurring with blurred/noisy image pairs," ACM Transactions on Graphics, vol. 26, No. 3, Jul. 2007).*
(Continued)

*Primary Examiner* — Yubin Hung
(74) *Attorney, Agent, or Firm* — Chip Law Group

(57) ABSTRACT

The present disclosure relates to an image processing apparatus and an image processing method whereby a point spread function can be estimated with high precision. An exclusion unit excludes a repetitive pattern from a degraded image. An estimation unit estimates a point spread function by use of the degraded image from which the repetitive pattern has been excluded by the exclusion unit. The present disclosure can be applied to, for example, an image processing apparatus or the like that estimates a point spread function (PSF) from a degraded image and that performs a blind deconvolution using the point spread function to generate a restored image from the degraded image.

12 Claims, 13 Drawing Sheets

(52) U.S. Cl.
CPC ............... *G06T 2207/20021* (2013.01); *G06T 2207/20052* (2013.01)

(56) References Cited

U.S. PATENT DOCUMENTS

| | | | |
|---|---|---|---|
| 2008/0175508 A1* | 7/2008 | Bando | G06T 5/003 382/255 |
| 2010/0215282 A1* | 8/2010 | Van Beek | G06T 3/4007 382/255 |
| 2011/0150353 A1* | 6/2011 | Watanabe | G06T 5/003 382/255 |
| 2012/0105655 A1* | 5/2012 | Ishii | G06T 5/003 348/208.4 |
| 2013/0177260 A1* | 7/2013 | Fujii | H04N 1/4092 382/309 |
| 2014/0023252 A1* | 1/2014 | Imai | A61B 6/4216 382/130 |
| 2014/0192266 A1* | 7/2014 | Biswas | H04N 5/21 348/607 |
| 2014/0354886 A1* | 12/2014 | Michaeli | H04N 1/4092 348/607 |
| 2015/0254810 A1* | 9/2015 | Heidrich | H04N 9/045 382/167 |

FOREIGN PATENT DOCUMENTS

| | | |
|---|---|---|
| JP | 2013-243763 A | 12/2013 |
| WO | 2011/099244 A | 8/2011 |
| WO | 2011/099244 A1 | 8/2011 |
| WO | 2013/031102 A | 3/2013 |
| WO | 2013/031102 A1 | 3/2013 |

OTHER PUBLICATIONS

Yuan et al. ("Image deblurring with blurred/noisy image pairs," ACM Transactions on Graphics, vol. 26, No. 3, Jul. 2007) (Year: 2007).*

Shan, et al., "High-quality Motion Deblurring from a Single Image", ACM Transactions on Graphics, 2008, pp. 01-10.

Qi Shan et al., "High-quality Motion Deblurring from a Single Image", ACM Transactions on Graphics (SIGGRAPH), 2008, pp. 10.

* cited by examiner

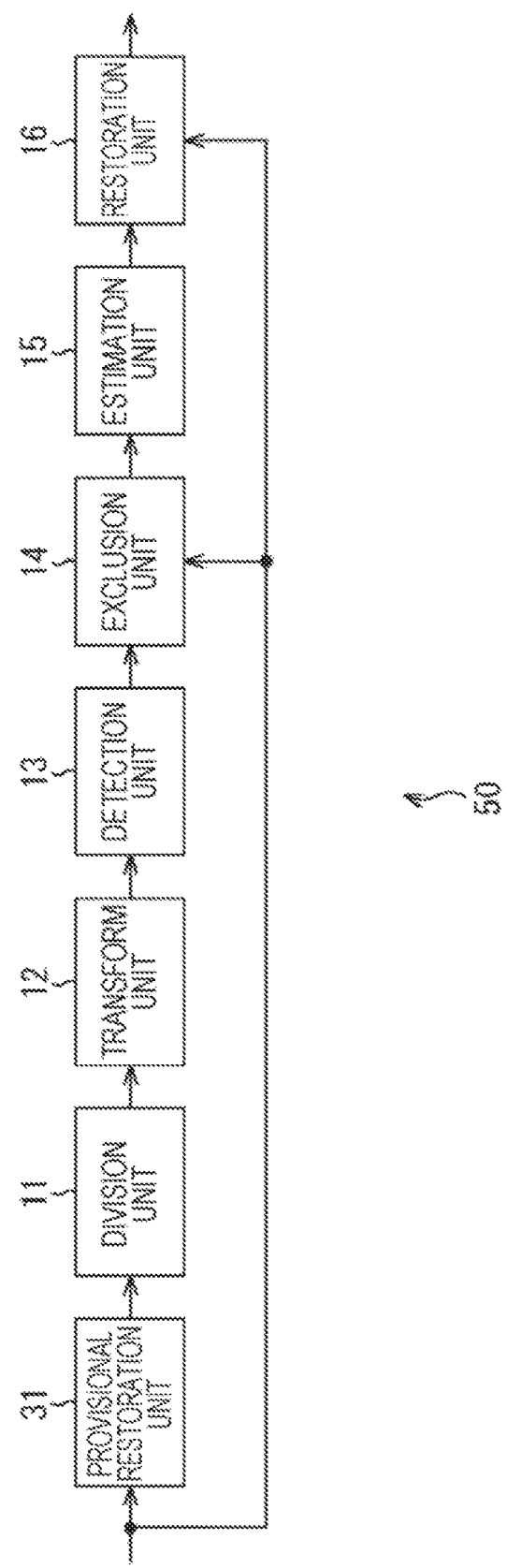

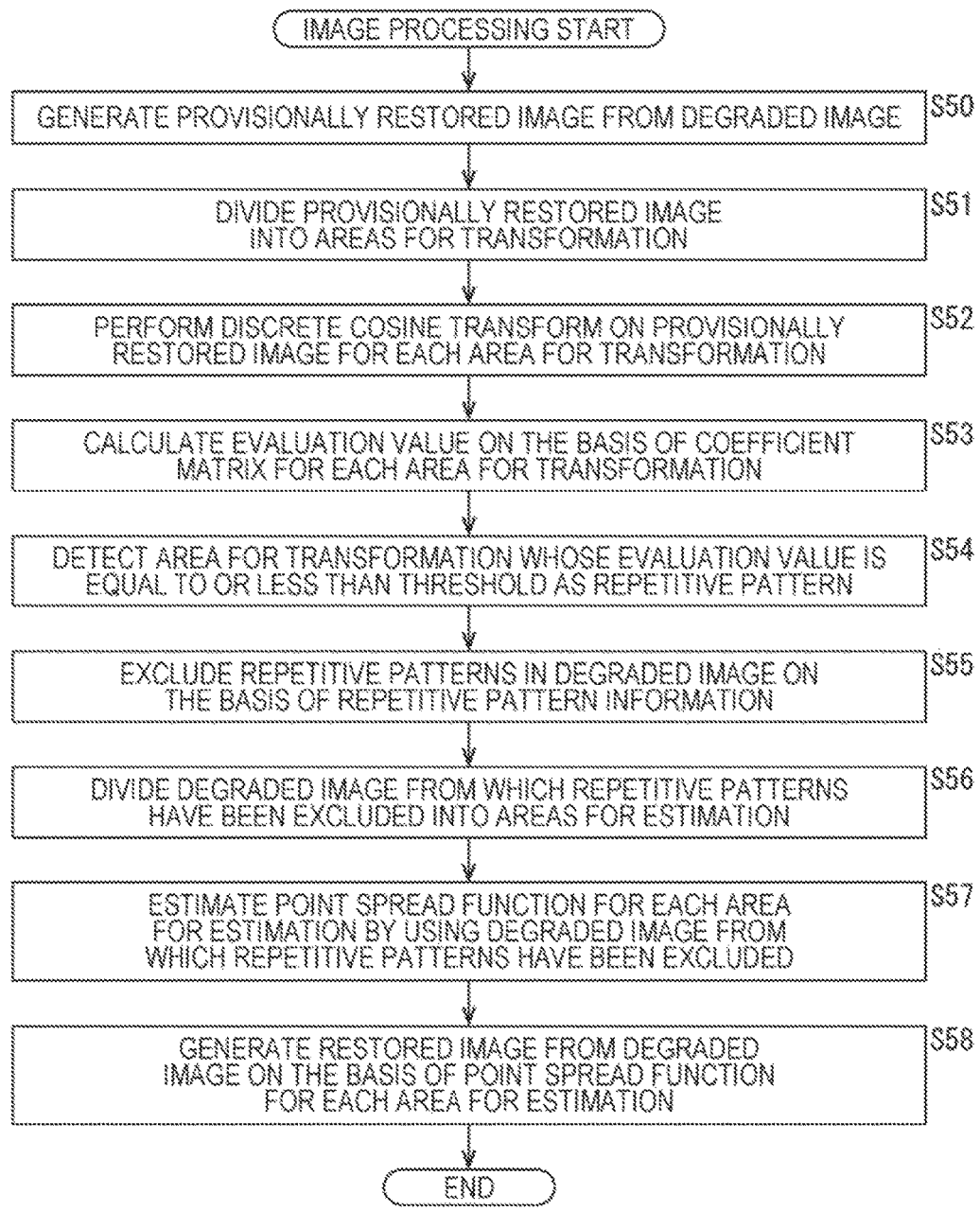

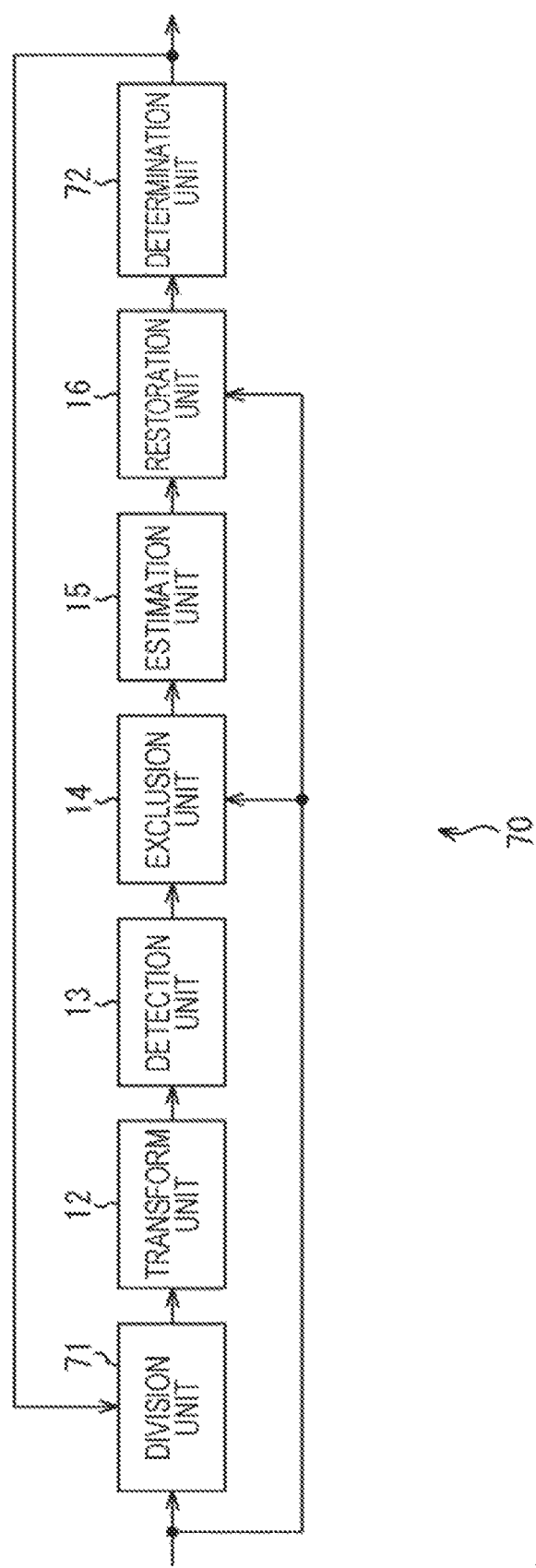

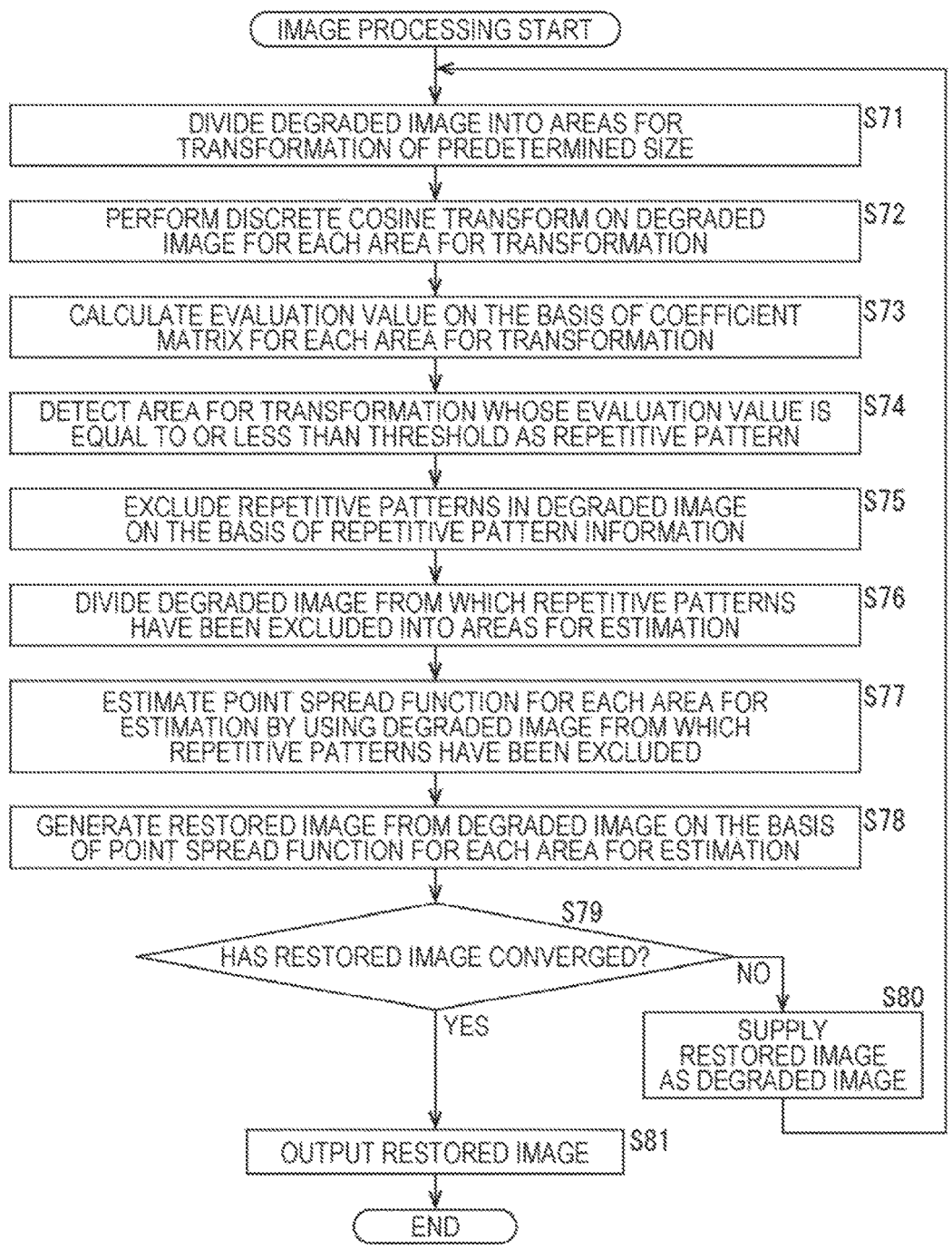

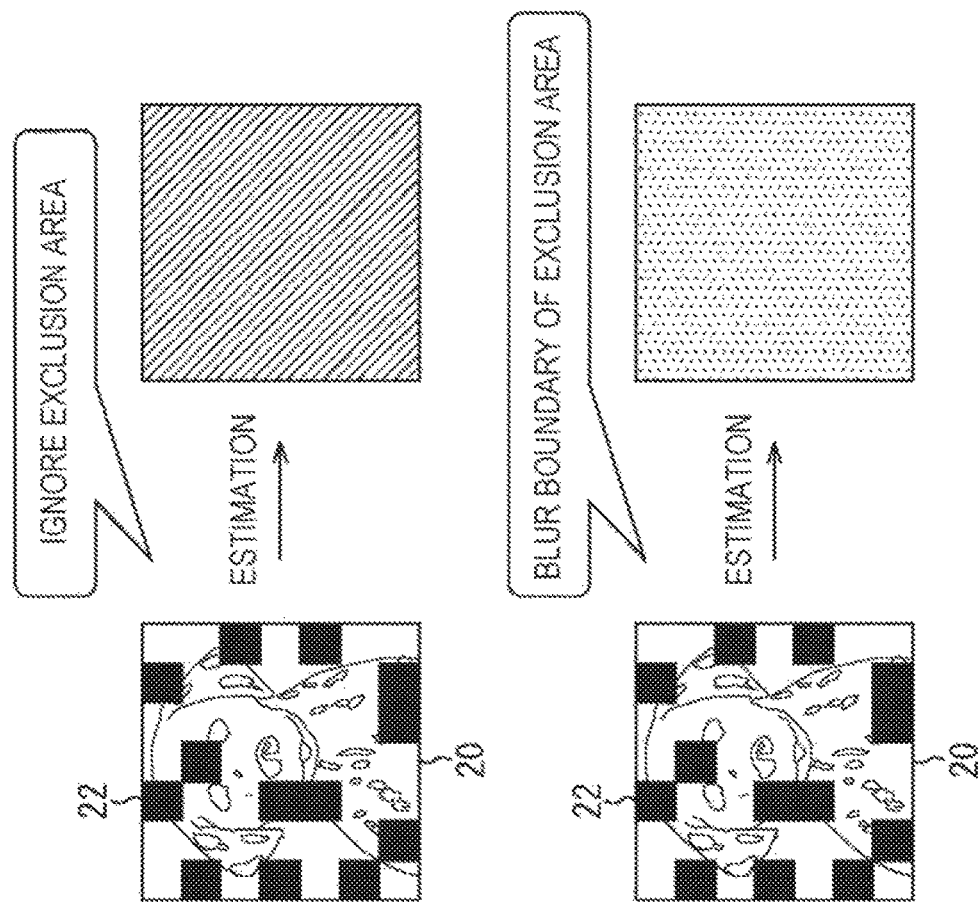

IMAGE PROCESSING APPARATUS AND IMAGE PROCESSING METHOD FOR ESTIMATING POINT SPREAD FUNCTION

CROSS REFERENCE TO RELATED APPLICATIONS

This application is a U. S. National Phase of International Patent Application No. PCT/JP2015/064404 filed on May 20, 2015, which claims priority benefit of Japanese Patent Application No. 2014-114628 filed in the Japan Patent Office on Jun. 3, 2014. Each of the above-referenced applications is hereby incorporated herein by reference in its entirety.

TECHNICAL FIELD

The present disclosure relates to an image processing apparatus and an image processing method, particularly to an image processing apparatus and an image processing method which make it possible to estimate a point spread function with high accuracy.

BACKGROUND ART

In recent years, a technique to restore an image before degradation (hereinafter, referred to as a restored image) from a degraded image which has been degraded by the characteristics of the lens such as aberration in an imaging apparatus have been devised. As this technique, there is a method in which the lens-specific degradation information is stored up in advance, and a correction data corresponding to the object distance or focal length is created on the basis of the degradation information, and a restored image is generated from a degraded image on the basis of the correction data (for example, see Patent Document 1).

However, when the lens-specific degradation information, the object distance, the focal length or the like is unknown, it is difficult to use such a technique. Further, in this technique, the restoration accuracy reduces when different degradation has occurred in the degraded image from the degradation according to the premeasured information having been stored up, due to a production error of the lens and others. Further, in the case of generating a restored image from a degraded image that has been captured by the interchangeable lens imaging apparatus, since the assumed number of lenses is large, the amount of degradation information stored in advance becomes large.

Therefore, a technique called a blind deconvolution (blind deconvolution) of performing restoration by calculating degradation information from a degraded image has been devised, rather than by measuring and storing the degradation information in advance. The blind deconvolution is a technique of generating a restored image by estimation of a point spread function (PSF) as degradation information from the degraded image and by deconvolution of the point spread function with respect to the degraded image (for example, see Patent Document 2 and Non-Patent Document 1).

CITATION LIST

Patent Document

Patent Document 1: Japanese Patent Application Laid-Open No. 2013-243763

Patent Document 2: International Patent Publication No. 2011/099244

NON-PATENT DOCUMENT

Non-Patent Document 1: "High-quality Motion Deblurring from a Single Image", Qi Shan, Jiaya Jia and Aseem Agarwala, SIGGRAPH 2008

SUMMARY OF THE INVENTION

Problems to be Solved by the Invention

However, when the degraded image contains a repetitive pattern, it is difficult to estimate the point spread function with high accuracy by the blind deconvolution. As a result, the quality of the restored image is degraded.

The present disclosure has been made in view of such circumstances, and makes it possible to estimate the point spread function with high accuracy.

Solutions to Problems

An image processing apparatus according to an aspect of the present disclosure includes: an exclusion unit for excluding a repetitive pattern from an image; an estimation unit for estimating a point spread function by using the image from which the repetitive pattern has been excluded by the exclusion unit.

The image processing method according to an aspect of the present disclosure corresponds to the image processing apparatus according to an aspect of the present disclosure.

In an aspect of the present disclosure, a repetitive pattern is excluded from an image, and a point spread function is estimated by using the image from which the repetitive pattern has been excluded.

Note that the image processing apparatus according to an aspect of the present disclosure can be achieved by executing a program in a computer.

Further, in order to achieve an image processing apparatus according to an aspect of the present disclosure, a program to be executed by a computer can be provided by being transmitted via a transmission medium or by being recorded on a recording medium.

Effects of the Invention

According to an aspect of the present disclosure, an image can be processed. Also, according to an aspect of the present disclosure, a point spread function can be estimated with high accuracy.

Note that the effects are not necessarily limited to those described here, and they may be any of effects described in the present disclosure.

BRIEF DESCRIPTION OF DRAWINGS

FIG. 7 is a block diagram showing a configuration example of a third embodiment of the image processing apparatus using the present disclosure.

FIG. 8 is a flowchart illustrating an image processing of the image processing apparatus in FIG. 7.

FIG. 9 is a block diagram showing a configuration example of a fourth embodiment of the image processing apparatus using the present disclosure.

FIG. 10 is a flowchart illustrating an image processing of the image processing apparatus in FIG. 9.

FIG. 11A and FIG. 11B are diagrams illustrating another example of the estimation of the point spread function.

MODE FOR CARRYING OUT THE INVENTION

Hereinafter, premises of the present disclosure and modes for implementing the present disclosure (hereinafter, referred to as embodiments) will be described. Note that the description will be made in the following order.

1. First embodiment: image processing apparatus (FIGS. 1 to 4)
2. Second embodiment: image processing apparatus (FIGS. 5 and 6)
3. Third embodiment: image processing apparatus (FIGS. 7 and 8)
4. Fourth embodiment: image processing apparatus (FIGS. 9 and 10)
5. Another example of the first embodiment to the fourth embodiment (FIGS. 11 and 12)
6. Fifth embodiment: computer (FIG. 13)

First Embodiment

Configuration Example of a First Embodiment of the Image Processing Apparatus

Figure 1:
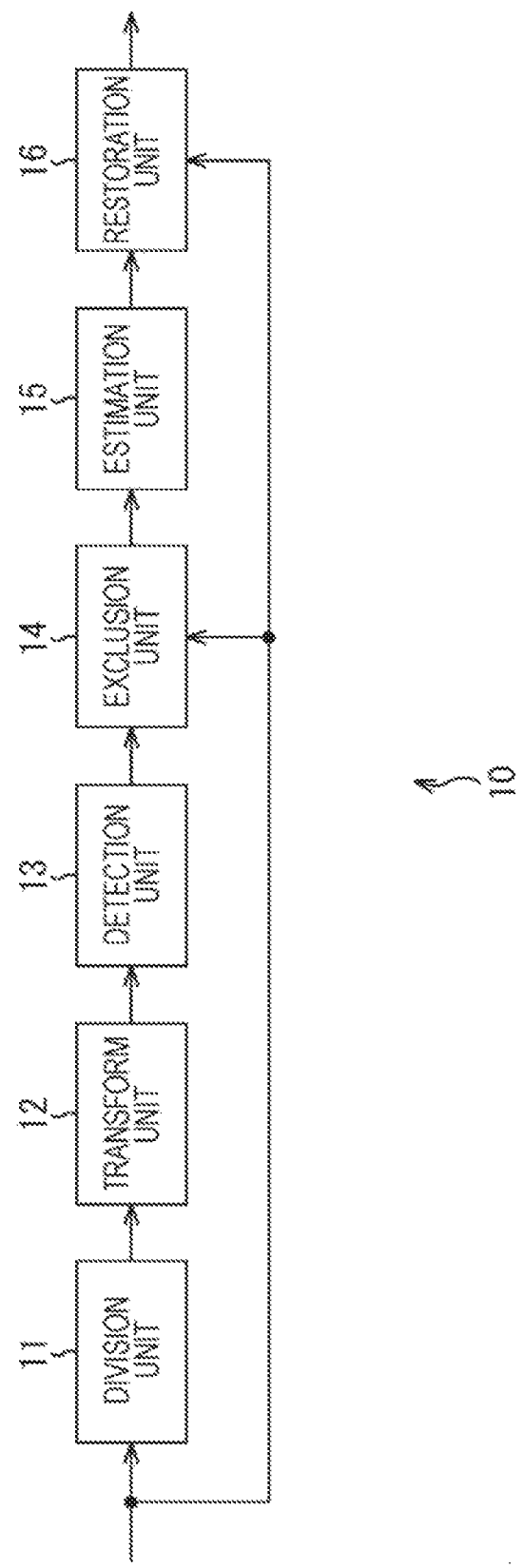
FIG. 1 is a block diagram showing a configuration example of a first embodiment of an image processing apparatus using the present disclosure.

FIG. 1 is a block diagram showing the configuration example of the first embodiment of the image processing apparatus using the present disclosure.

The image processing apparatus 10 in FIG. 1 is constituted by a division unit 11, a transform unit 12, a detection unit 13, an exclusion unit 14, an estimation unit 15 and a restoration unit 16. The image processing apparatus 10 generates a restored image from a degraded image by a blind deconvolution.

More specifically, the division unit 11 of the image processing apparatus 10 divides a degraded image input from outside into areas for transformation each having a predetermined size. The division unit 11 supplies the degraded image of each divided area for transformation to the transform unit 12.

The transform unit 12 performs a discrete cosine transform (DCT) on the degraded image supplied from the division unit 11, for each area for transformation. The transform unit 12 supplies the coefficient matrix obtained from the result of the discrete cosine transform to the detection unit 13.

The detection unit 13 detects an area for transformation where the ratio of the first-order component of the coefficient matrix is equal to or less than a threshold from the degraded image as a repetitive pattern, on the basis of the coefficient matrix of each area for transformation supplied from the transform unit 12.

More specifically, the detection unit 13 calculates an evaluation value on the basis of the coefficient matrix, for each area for transformation using the following equation (1).

[Mathematical Formula 1]

$$\text{Score} = \frac{|X_{1,2}|^2 + |X_{2,1}|^2 + |X_{2,2}|^2}{\sum_{i,j \neq (1,1)} |X_{i,j}|^2} \quad (1)$$

In the equation (1), Score represents the evaluation value, and $X_{i,j}$ represents the coefficient of the i-th row, j-th column of the coefficient matrix. According to the equation (1), as the evaluation value, the ratio of a first-order component of the coefficient matrix excluding a DC component is calculated.

Here, the discrete cosine transform is a matrix corresponding to an area in which a first-order base includes one edge and corresponding to an area in which a second or higher-order base includes at least two edges. In other words, the second or higher-order base of the discrete cosine transform corresponds to the area including a repetitive pattern. Therefore, as the evaluation value is smaller, i.e. as the ratio of the first-order component is smaller, the area for transformation is more likely to be an area including a repetitive pattern. Therefore, the detection unit 13 detects an area for transformation whose evaluation value is equal to or less than a threshold, as a repetitive pattern. The detection unit 13 supplies repetitive pattern information representing the position of the area for transformation detected as a repetitive pattern to the exclusion unit 14.

The exclusion unit 14 excludes, by masking, an area of the position indicated by the repetitive pattern information in the degraded image which is input from outside, as a repetitive pattern, on the basis of the repetitive pattern information supplied from the detection unit 13. Note that the exclusion unit 14 may exclude the repetitive pattern not by masking but by painting the repetitive pattern in the degraded image in a predetermined color (e.g. black). The exclusion unit 14 supplies the degraded image from which the repetitive patterns have been excluded to the estimation unit 15.

The estimation unit 15 divides the degraded image from which repetitive patterns have been excluded, which is supplied from the exclusion unit 14 into areas for estimation each having the same size as the area for transformation. The estimation unit 15 uses the degraded image from which the repetitive patterns have been excluded, to estimate the point spread function of the same size as the area for transformation, for each area for estimation. As a method of estimating the point spread function, a blind deconvolution technique described in Non-Patent Document 1 and the like can be employed. Further, the size of the point spread function, for example, is previously input from the outside. The estimation unit 15 supplies the estimated point spread function to the restoration unit 16.

The restoration unit 16, generates a restored image from the degraded image input from the outside, for each area for estimation, on the basis of the point spread function supplied from the estimation unit 15. As a method for generating a restored image, a technique in non-blind deconvolution (non-blind deconvolution), such as a Wiener filter method or a Richardson-Lucy method can be adopted. In this case, the restoration unit 16 generates a restored image by using a point spread function supplied from the estimation unit 15 as it is.

Further, as a method of generating the restored image, a technique in a blind deconvolution can also be used. In this case, the restoration unit 16, by using the point spread function as an initial value, obtains a point spread function, and then generates a restored image using the point spread function. The restoration unit 16 outputs the restored image.

(Description of a Blind Deconvolution)

Figure 2:
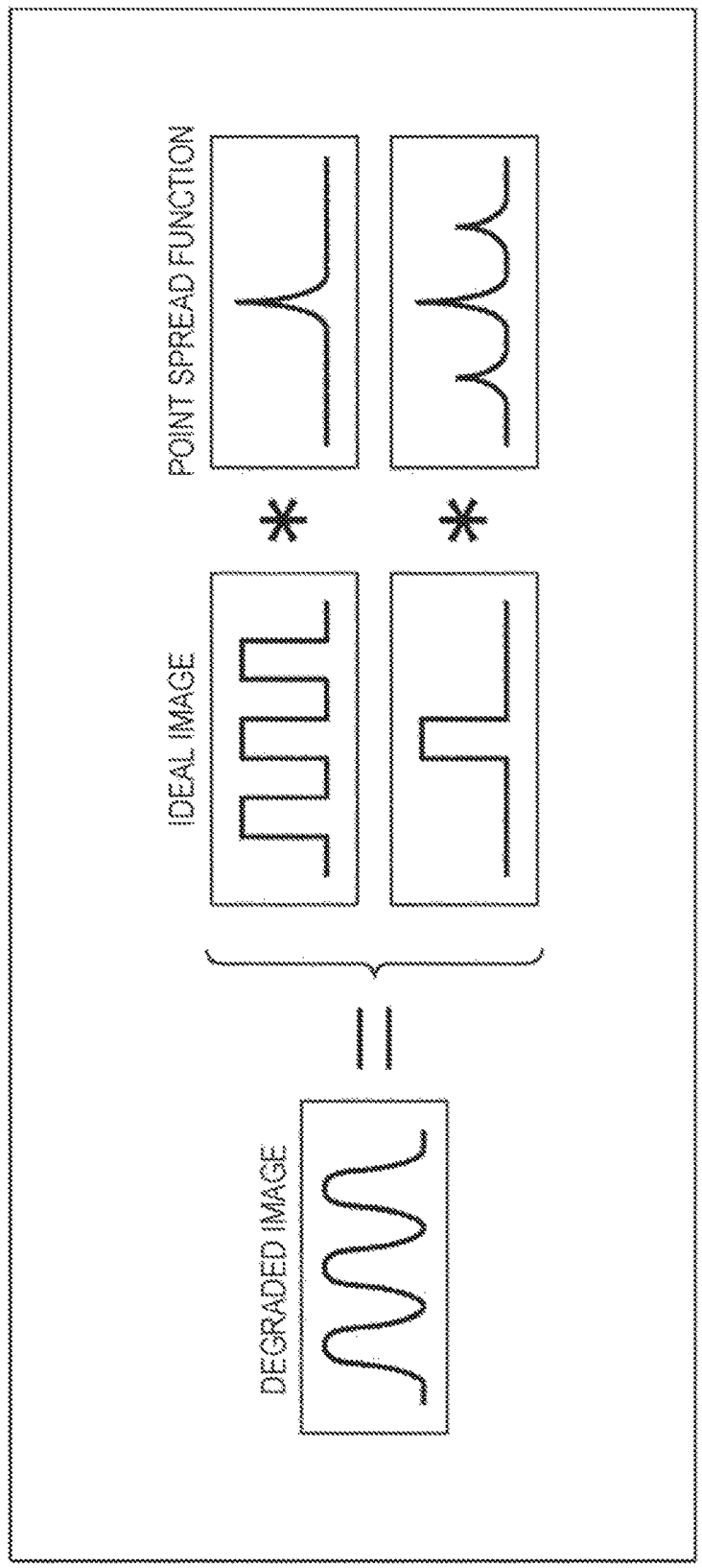
FIG. 2 is a diagram illustrating a blind deconvolution.
Figure 3:
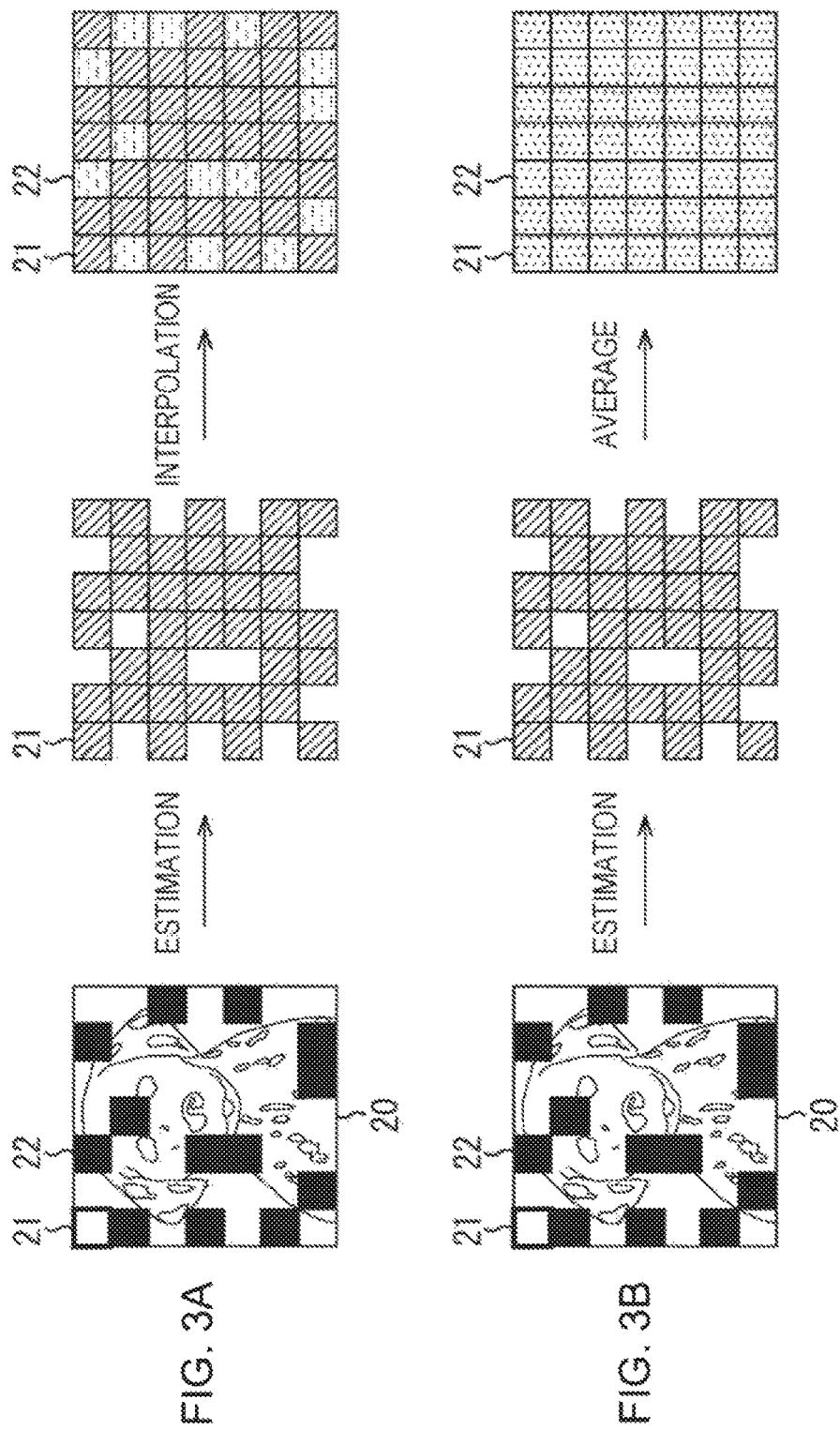
FIG. 3A and FIG. 3B are diagrams illustrating an estimation of a point spread function by an estimation unit in FIG. 1.

FIG. 2 is a diagram illustrating a blind deconvolution.

Note that, in FIG. 2, the waveform represents a one-dimensional cross-section of a luminance signal.

In the blind deconvolution, degradation in the degraded image is assumed to have a linearity, and the relationship between a degraded image and an ideal image without degradation is defined by the following equation (2).

[Mathematical Formula 2]

$$b = k * 1 \Rightarrow B = K \cdot L \quad (2)$$

In the equation (2), b represents a degraded image, l represents an ideal image, k represents a point spread function expressing a degradation, * represents a convolution integral. B represents a degraded image after Fourier transform, L represents an ideal image after Fourier transform, K represents a point spread function expressing a degradation after Fourier transform.

According to the equation (2), a degraded image is obtained by a convolution integral of an ideal image and a point spread function representing the degradation. Note that, the influence of noise is ignored in the equation (2).

In the blind deconvolution, only the degraded image is known, and the point spread function and the ideal image are unknown. Therefore, to seek the point spread function and the ideal image at the same time corresponds to an ill-conditioned problem. Therefore, under the condition of the equation (2), it is difficult to determine the point spread function and the ideal image simultaneously due to indefiniteness of the solution. In particular, when the degraded image contains a repetitive pattern, there are cases where a significant error is caused in the point spread function depending on the way of expansion of the multiplication in the right-hand side.

For example, as shown in FIG. 2, when the degraded image includes a repetitive pattern, and the waveform of a luminance signal of the degraded image is the waveform shown in the left-hand side of FIG. 2, one of the two combinations shown in the right-hand side of FIG. 2 can be obtained as a combination of the ideal image and the point spread function.

However, when the repetitive pattern contained in the degraded image is also present in the ideal image, the combination of the upper of the right-hand side in FIG. 2 is correct, and the combination of the lower is unsuccessful. Therefore, in this case, when the combination of the lower of the right-hand side in FIG. 2 is obtained, a serious error occurs in the point spread function. As a result, the quality of the restored image generated by using the point spread function is degraded.

Therefore, the image processing apparatus 10 excludes repetitive patterns of the degraded image and estimates the point spread function with high accuracy by estimating the point spread function using a degraded image from which repetitive patterns have been excluded.

(Description of the Estimation of the Point Spread Function)

FIGS. 3A-3B are diagrams illustrating the estimation of the point spread function by the estimation unit 15 in FIG. 1.

As shown on the left side of FIG. 3A and FIG. 3B, the estimation unit 15 estimates the point spread function for each area for estimation 21 of the degraded image 20 from which repetitive patterns have been excluded. However, since the size of the area for estimation 21 is the same as the size of area for transformation, it is difficult to estimate the point spread function by using the area for transformation 22 excluded as a repetitive pattern (hereinafter, referred to as an exclusion area), as the area for estimation 21.

Therefore, the area for estimation 21 corresponding to the point spread function estimated by the estimation unit 15 is an area other than the exclusion area 22 as shown in the middle of FIG. 3A and FIG. 3B. Therefore, the estimation unit 15 seeks the point spread function of the exclusion area 22, for example, from the point spread function of the area for estimation 21 other than the exclusion area 22 there about (e.g. vertical and horizontal) by using a linear interpolation (bilinear method), as shown on the right side of FIG. 3A. In this case, even when the point spread function varies depending on the position within the image (the point spread function is Space_Variant), the point spread function can be estimated accurately.

Note that the estimation unit 15 can be configured to determine the average value of the point spread function of the areas for estimation 21 other than the exclusion areas 22 as the point spread function of all the areas for estimation 21, for example, as shown on the right side of FIG. 3B.

(Description of the Processing of the Image Processing Apparatus)

Figure 4:
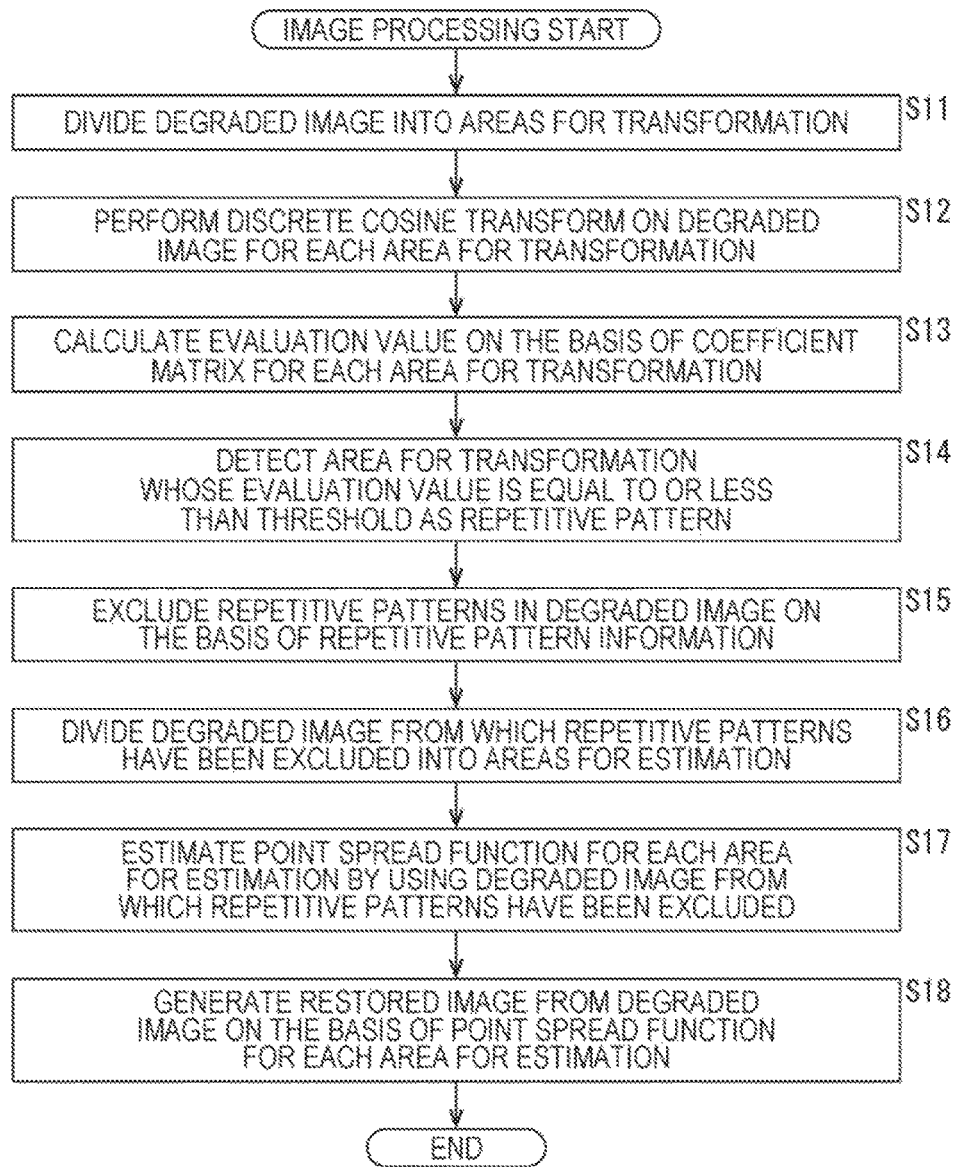
FIG. 4 is a flowchart illustrating the image processing of the image processing apparatus in FIG. 1

FIG. 4 is a flowchart illustrating image processing of the image processing apparatus 10 in FIG. 1. The image processing is started, for example, when a degraded image is input to the image processing apparatus 10 from the outside.

In step S11 in FIG. 4, the division unit 11 of the image processing apparatus 10 divides a degraded image input from outside into areas for transformation. The division unit 11 supplies the degraded image of each divided area for transformation to the transform unit 12.

In step S12, the transform unit 12 performs discrete cosine transform on the degraded image supplied from the division unit 11, for each area for transformation. The transform unit 12 supplies the coefficient matrix obtained from the result of the discrete cosine transform to the detection unit 13.

In step S13, the detection unit 13 calculates the evaluation value on the basis of the coefficient matrix by the equation (1) described above, for each area for transformation. In step S14, the detection unit 13 detects an area for transformation whose calculated evaluation value is equal to or less than a threshold, as a repetitive pattern. The detection unit 13 supplies a repetitive pattern information representing the position of the area for transformation detected as a repetitive pattern to the exclusion unit 14.

In step S15, the exclusion unit 14 excludes, by masking, an area of the position indicated by the repetitive pattern information in the degraded image input from outside as a repetitive pattern, on the basis of the repetitive pattern information supplied from the detection unit 13. The exclusion unit 14 supplies the degraded image from which the repetitive patterns have been excluded to the estimation unit 15.

In step S16, the estimation unit 15 divides the degraded image from which repetitive patterns have been excluded, which is supplied from the exclusion unit 14 into areas for estimation. In step S17, the estimation unit 15 uses the degraded image from which repetitive patterns have been excluded, so as to estimate the point spread function for each area for estimation. The estimation unit 15 supplies the estimated point spread function to the restoration unit 16.

In step S18, the restoration unit 16 generates a restored image from the degraded image, on the basis of the point spread function supplied from the estimation unit 15, for each area for estimation, and outputs the restored image. Then, the process is terminated.

As described above, the image processing apparatus 10 excludes the repetitive patterns from the degraded image, and estimates the point spread function using a degraded image from which repetitive patterns have been excluded. Therefore, the point spread function can be estimated with high accuracy. As a result, the image quality of the restored image generated using the point spread function can be improved. Further, since the point spread function can be estimated with high accuracy irrespective of whether the repetitive patterns are present in the degraded image, stability of the estimation result of the point spread function is improved.

Further, since the size of the area for estimation is the same as the size of the area for transformation, the speed of the estimation processing is improved by excluding repetitive patterns to reduce the area for estimating the point spread function.

Further, the image processing apparatus 10 detects area for transformation whose evaluation value calculated according to the equation (1) described above is equal to or less than the threshold as a repetitive pattern. Accordingly, the image processing apparatus 10 can leave an area containing only a single edge (straight), where the point spread function can be estimated with the highest accuracy in the method of estimating the point spread function in the blind deconvolution, as an area other than the repetitive pattern. As a result, the accuracy of the point spread function improves.

In addition, the image processing apparatus 10 can detect a repetitive pattern having a period smaller than that of the point spread function on the basis of the ratio of the first-order component of the coefficient matrix since the sizes of the area for transformation and the point spread function are the same. Therefore, a repetitive pattern which has a greater period than that of the point spread function and which does not affect the estimation of the point spread function can be prevented from being excluded in vain.

Second Embodiment

Configuration Example of a Second Embodiment of the Image Processing Apparatus

Figure 5:
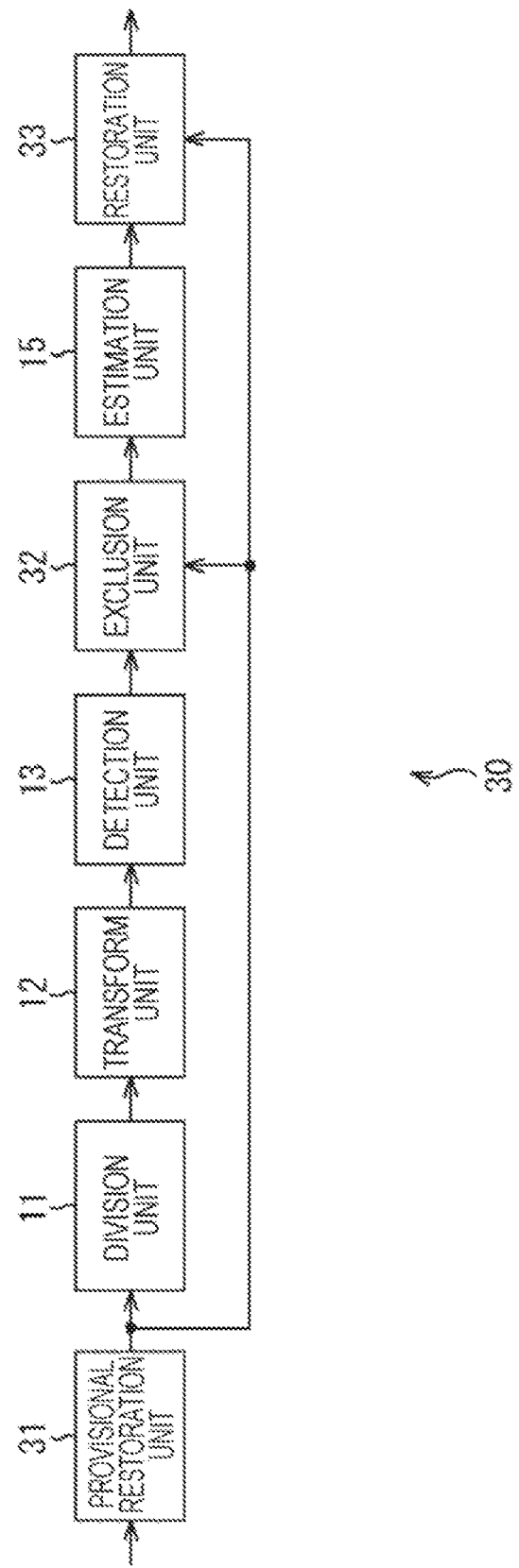
FIG. 5 is a block diagram showing a configuration example of a second embodiment of the image processing apparatus using the present disclosure.

FIG. 5 is a block diagram showing the configuration example of the second embodiment of the image processing apparatus using the present disclosure.

In the configuration shown in FIG. 5, the same configuration as the configuration shown in FIG. 1 is denoted by the same reference numeral. Redundant descriptions will be omitted as appropriate.

The configuration of the image processing apparatus 30 in FIG. 5 is different from the configuration in FIG. 1, in that a provisional restoration unit 31 is newly provided and in that an exclusion unit 32 and a restoration unit 33 are provided instead of the exclusion unit 14 and the restoration unit 16. The image processing apparatus 30 generates a provisionally restored image from the degraded image and generates a finally restored image from the provisionally restored image.

To be specific, the provisional restoration unit 31 of the image processing apparatus 30 generates a provisionally restored image from the degraded image input from the outside by filtering with a shock filter or the like, or a blind deconvolution. The provisional restoration unit 31 supplies the generated provisionally restored image to the division unit 11, exclusion unit 32 and restoration unit 33.

The exclusion unit 32 excludes the area of the position indicated by the repetitive pattern information in a provisionally restored image supplied from the provisional restoration unit 31, by the masking, as a repetitive pattern on the basis of the repetitive pattern information supplied from the detection unit 13. Note that the exclusion unit 32 may excludes a repetitive pattern not by a masking, but by painting the repetitive pattern in the provisionally restored image in a predetermined color (e.g. black). The exclusion unit 32 supplies the provisionally restored image from which repetitive patterns have been excluded to the estimation unit 15.

The restoration unit 33 generates a restored image from the provisionally restored image supplied from the provisional restoration unit 31 on the basis of the point spread function supplied from the estimation unit 15, for each area for estimation. As a method of generating the restored image, a technique similar to the technique in the restoration unit 16 may be adopted. The restoration unit 33 outputs the restored image.

(Description of the Processing of the Image Processing Apparatus)

Figure 6:
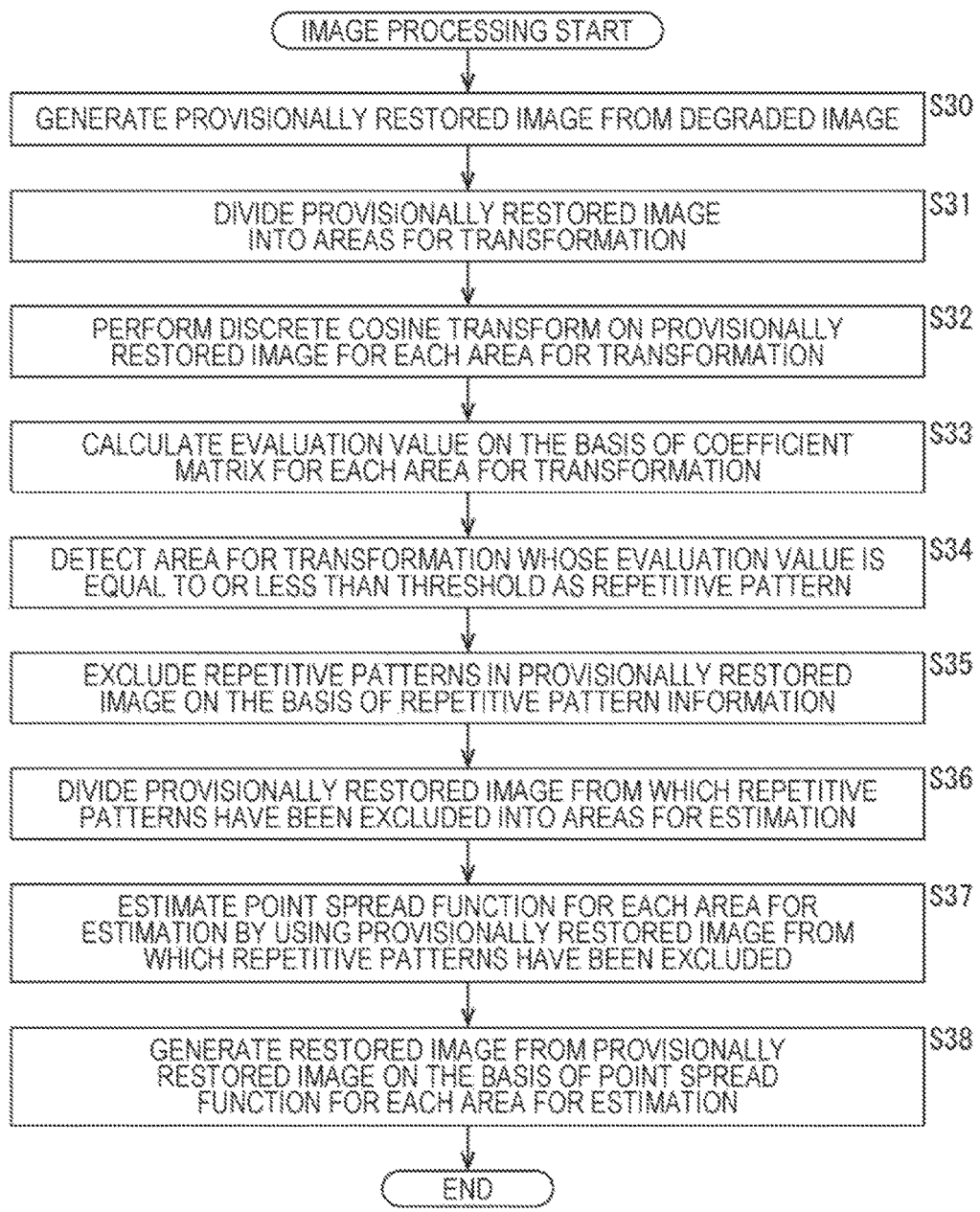
FIG. 6 is a flowchart illustrating an image processing of the image processing apparatus in FIG. 5.

FIG. 6 is a flowchart illustrating image processing of the image processing apparatus 30 in FIG. 5. The image processing is started, for example, when a degraded image is input to the image processing apparatus 30 from the outside.

In step S30 in FIG. 6, the provisional restoration unit 31 of the image processing apparatus 30 generates a provisionally restored image from the degraded image input from outside by filtering with a shock filter or the like, or a blind deconvolution. The provisional restoration unit 31 supplies the generated provisionally restored image to the division unit 11, exclusion unit 32 and restoration unit 33.

In step S31, the division unit 11 divides the provisionally restored image supplied from the provisional restoration unit 31 into the areas for transformation. The division unit 11 supplies a provisionally restored image of each divided area for transformation to the transform unit 12.

In step S32, the transform unit 12 performs a discrete cosine transform on the provisionally restored image supplied from the division unit 11, for each area for transformation. The transform unit 12 supplies the coefficient matrix obtained from the result of the discrete cosine transform to the detection unit 13.

Since the processing in steps S33 and S34 is similar to the processing in steps S13 and S14 in FIG. 4, a description thereof is omitted.

In step S35, the exclusion unit 32 excludes by the masking, the area of the position indicated by the repetitive pattern information in the provisionally restored image supplied from the provisional restoration unit 31, as a repetitive pattern, on the basis of the repetitive pattern information supplied from the detection unit 13. The exclusion unit 32 supplies the provisionally restored image from which repetitive patterns have been excluded to the estimation unit 15.

In step S36, the estimation unit 15 divides, the provisionally restored image from which repetitive patterns have been excluded, which is supplied from exclusion unit 32, into the areas for estimation. In step S37, the estimation unit 15 uses the provisionally restored image from which repetitive patterns have been excluded, to estimate the point spread function for each area for estimation. The estimation unit 15 supplies the estimated point spread function to the restoration unit 33.

In step S38, the restoration unit 33 generates a restored image from the provisionally restored image supplied from the provisional restoration unit 31, for each area for estimation, on the basis of the point spread function supplied from the estimation unit 15, and outputs the image. Then, the processing is terminated.

Third Embodiment

Configuration Example of a Third Embodiment of the Image Processing Apparatus

FIG. 7 is a block diagram showing the configuration example of the third embodiment of the image processing apparatus using the present disclosure.

In the configurations shown in FIG. 7, the same configuration as the configuration in FIGS. 1 and 5 is denoted by the same reference numeral. Redundant descriptions will be omitted as appropriate.

The configuration of the image processing apparatus 50 in FIG. 7 is different from the configuration in FIG. 1 in that the provisional restoration unit 31 is newly provided. The image processing apparatus 50 detects repetitive patterns from the provisionally restored image, and excludes the repetitive patterns from the degraded image.

(Description of the Processing of the Image Processing Apparatus)

FIG. 8 is a flowchart illustrating the image processing of the image processing apparatus 50 in FIG. 7. The image processing is started, for example, when a degraded image is input to the image processing apparatus 50 from the outside.

Since the processing in steps S50 to S54 in FIG. 8 is similar to the processing insteps S30 to S34 in FIG. 6, a description thereof is omitted.

Since the processing in steps S55 to S58 is similar to the processing in steps S15 to S18 in FIG. 4, a description thereof is omitted.

Fourth Embodiment

Configuration Example of a Fourth Embodiment of the Image Processing Apparatus

FIG. 9 is a block diagram showing the configuration example of the fourth embodiment of the image processing apparatus using the present disclosure.

In the configuration shown in FIG. 9, the same configuration as the configuration shown in FIG. 1 is denoted by the same reference numeral. Redundant descriptions will be omitted as appropriate.

The configuration of the image processing apparatus 70 in FIG. 9 differs from the configuration in FIG. 1 in that a division unit 71 is provided instead of the division unit 11, and a determination unit 72 is newly provided. The image processing apparatus 70 generates a finally restored image by repeating restoration by using the restored image generated from the degraded image as a new degraded image.

The division unit 71 of the image processing apparatus 70 divides a degraded image which is input from the outside or a degraded image supplied from the determination unit 72, into areas for transformation. The division unit 11 supplies the degraded image of each divided area for transformation to the transform unit 12.

The determination unit 72 determines whether the restored image generated by the restoration unit 16 has converged. For example, the determination unit 72 determines that the restored image has converged when the difference between a restored image generated by the current restoration and a restored image generated by the previous restoration is equal to or smaller than a threshold, and it is determined that the restored image has not converged when the difference is larger than the threshold.

The determination unit 72 supplies the restored image to the division unit 71 as a degraded image when it is determined that the restored image has not converged. Thus, restoration is repeated. On the other hand, when it is determined that the restored image has converged, the determination unit 72 outputs the restored image as a finally restored image.

(Description of the Processing of the Image Processing Apparatus)

FIG. 10 is a flowchart illustrating image processing of the image processing apparatus 70 in FIG. 9. The image processing is started, for example, when a degraded image is input to the image processing apparatus 70 from the outside.

In step S71 in FIG. 10, the division unit 71 of the image processing apparatus 70 divides a degraded image input from the outside or a degraded image supplied from determination unit 72 into the areas for transformation. The division unit 71 supplies the degraded image of each divided area for transformation to the transform unit 12.

Since the processing in steps S72 to S77 is similar to the processing in steps S12 to S17 in FIG. 4, a description thereof is omitted.

In step S78, the restoration unit 16 generates a restored image from the degraded image on the basis of the point spread function supplied from the estimation unit 15, for each area for estimation, and then, supplies the image to the determination unit 72.

In step S79, the determination unit 72 determines whether the restored image supplied from the restoration unit 16 has converged. If it is determined in the step S79 that the restored image has not converged, the determination unit 72 supplies the restored image to the division unit 71 as a degraded image in step S80. Then, the processing returns to step S71, and the processing of steps S71 to S80 is repeated until the restored image is determined to have converged.

On the other hand, when the restored image is determined to have converged in step S79, the determination unit 72 outputs the restored image as a finally restored image in step S81, and the processing ends.

As described above, since the image processing apparatus 70 detects a repetitive pattern by using the restored image, the repetitive pattern can be accurately detected.

Note that the image used for the exclusion and restoration may be a restored image supplied from the determination unit 72. In this case, since the restoration is performed repeatedly on the degraded image, the accuracy of the restoration increases and quality of the restored image can be improved. Further, in the fourth embodiment, although the restoration is repeated until the restored image has converged, the restoration may be repeated a predetermined number of times.

In addition, in the first to fourth embodiments, although the estimation of the point spread function is performed for each area for estimation, the estimation of the point spread function may be performed for the entire degraded image. In this case, the estimation unit 15 performs estimation of the point spread function for each degraded image 20 from which repetitive patterns have been excluded as shown on the left side of FIG. 11A and FIG. 11B.

In this case, the estimation unit 15 performs, for example, the estimation by using the area other than the exclusion area 22 in the degraded image 20 as shown in FIG. 11A. Alternatively, the estimation unit 15 performs boundary processing such as blurring on the boundary of the exclusion area 22 in the degraded image 20, and performs the estimation using the resulting image with inconspicuous masking boundaries, as shown in FIG. 11B. As described above, when the estimation of the point spread function is performed on the entire degraded image, since the number of times of the estimation for the entire degraded image is small, a restored image can be generated at a high speed.

Further, in the first to fourth embodiments, though the size of the area for estimation is set to be identical to the size of the area for transformation, the size of the area for estimation is not limited thereto only if the size is equal to or larger than the size of the point spread function. When the size of the area for estimation is different from the size of the area for transformation, the estimation unit 15 performs estimation of the point spread function for each area for estimation 101 of the degraded image 20 from which repetitive patterns have been excluded as shown on the left side of FIG. 12A to FIG. 12D.

Figure 12A:
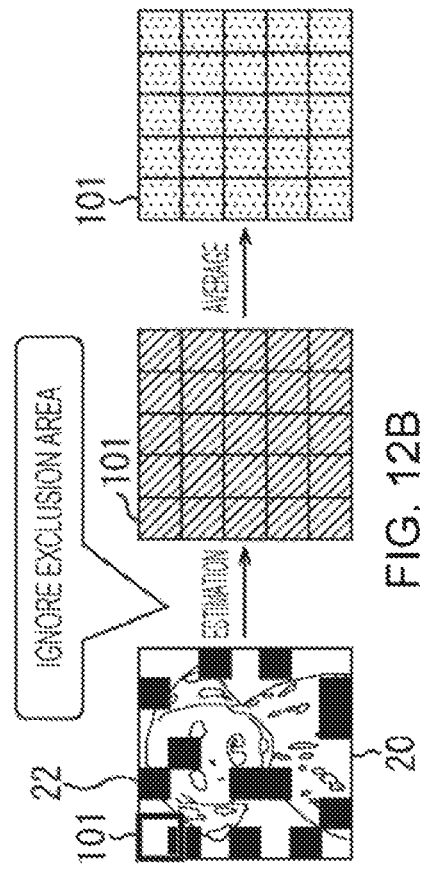
FIG. 12A, FIG. 12B, FIG. 12C and FIG. 12D are diagrams illustrating further another example of the estimation of the point spread function.
Figure 12B:
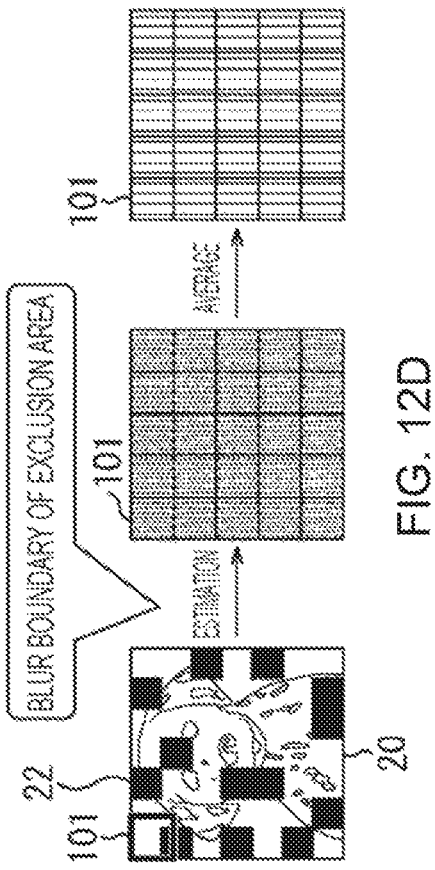

In this case, the estimation unit 15 performs the estimation using the area other than the exclusion area 22 in the degraded image 20 as shown in FIG. 12A and FIG. 12B. Alternatively, the estimation unit 15 performs a boundary processing for the boundary of the exclusion area 22 in the degraded image 20 as shown in FIG. 12C and FIG. 12D, and performs estimation using the resulting images with inconspicuous masking boundaries.

Figure 12C:
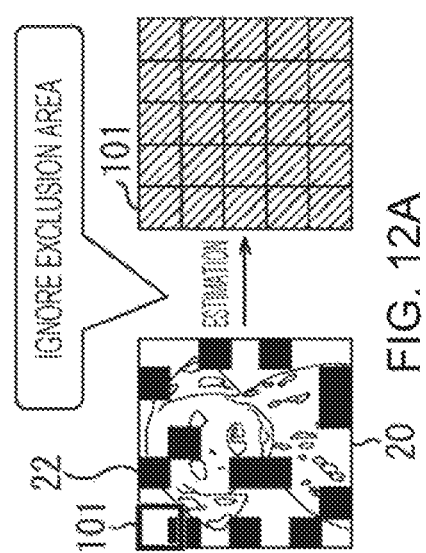
Figure 13:
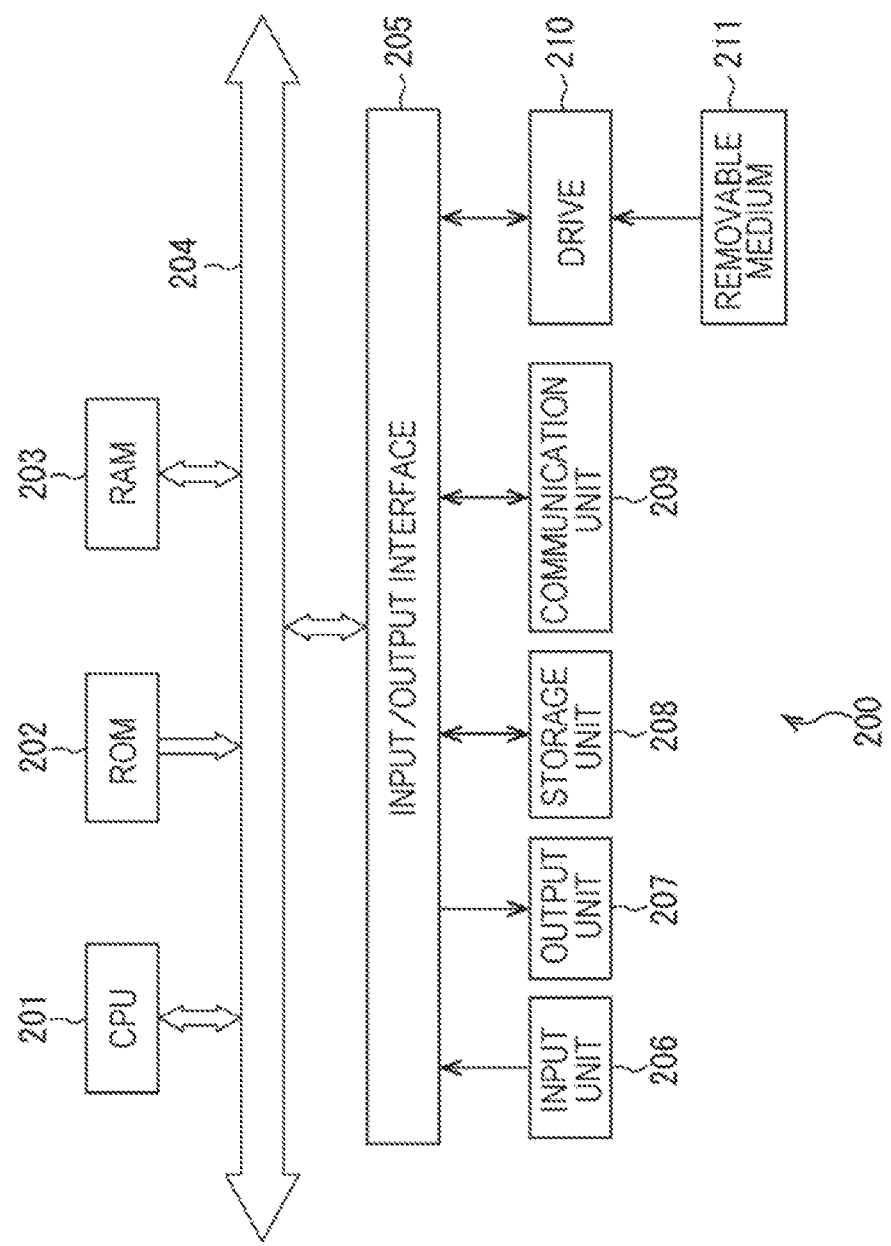
FIG. 13 is a block diagram illustrating a configuration example of hardware of a computer.

The estimation unit 15, for example, outputs the point spread function for each area for estimation 101 as a final point spread function as shown in FIG. 12A and FIG. 12C. In this case, even when a point spread function is different depending on its position in the image (the point spread function is Space_Variant), an exact point spread function can be output.

Figure 12D:
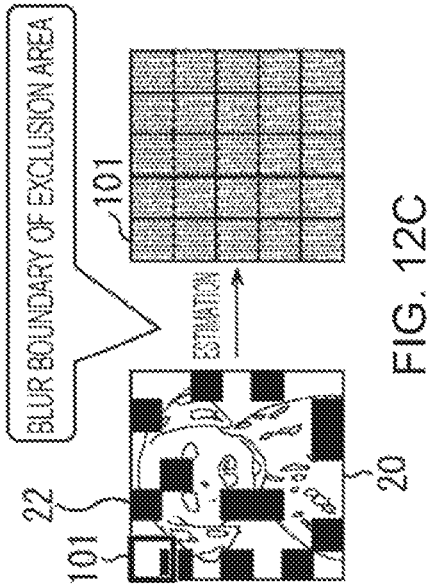

Note that the estimation unit 15 can output the average value of the point spread function of areas for estimation 101 as a final point spread function, as shown in FIG. 12B and FIG. 12D.

Further, in the first to fourth embodiments, although the size of the area for transformation is made identical to the size of the point spread function, the size of the area for transformation may not be identical to the size of the point spread function when the size of the area for transformation is equal to or larger than the size of the point spread function.

When the size of the area for transformation is larger than the size of the point spread function, the evaluation value is, for example, obtained by the following equation (3).

[Mathematical Formula 3]

$$\text{Score} = \frac{\sum_{i,j \neq (1,1) \wedge i < th \wedge j < th} |X_{i,j}|^2}{\sum_{i,j \neq (1,1)} |X_{i,j}|^2} \quad (3)$$

In the equation (3), Score represents the evaluation value, and $X_{i,j}$ represents the coefficient of the i-th row, j-th column of the coefficient matrix. In addition, th represents 2×size of area for transformation $l_{patch}$÷size of point spread function $l_{psf}$. According to the equation (3), the ratio of components whose orders are equal to or less than a predetermined value, in the coefficient matrix excluding a DC component, is calculated, as the evaluation value. Then the area for transformation whose evaluation value is equal to or less than the threshold is detected as a repetitive pattern.

Fifth Embodiment (Description of the Computer Using the Present Disclosure)

A series of processes described above can be executed by hardware or by software. In the case of executing the series of processes by software, a program constituting the software is installed on a computer. Here, the computer includes a computer incorporated in dedicated hardware or a computer which can execute various functions by various programs installed therein, for example, a general-purpose personal computer.

FIG. 13 is a block diagram illustrating a configuration example of hardware of a computer that executes the series of processes described above by the program.

In the computer 200, a central processing unit (CPU) 201, a read only memory (ROM) 202, and a random access memory (RAM) 203 are connected to each other via a bus 204.

The bus 204 is further connected with an input/output interface 205. The input/output interface 205 is connected with an input unit 206, an output unit 207, a storage unit 208, a communication unit 209, and a drive 210.

The input unit 206 includes a keyboard, a mouse, and a microphone. The output unit 207 includes a display and a speaker. The storage unit 208 includes a hard disk and a nonvolatile memory. The communication unit 209 includes a network interface. The drive 210 drives a magnetic disk, an optical disk, a magneto-optical disk, or a removable medium 211 such as a semiconductor memory.

In the computer 200 configured as described above, the abovementioned series of processes is performed by executing a program after the CPU 201 loads, for example, the program stored in the storage unit 208 into the RAM 203 through the input/output interface 205 and the bus 204.

The program to be executed by the computer 200 (CPU 201), for example, can be provided by being recorded in the removable medium 211 as a package medium or the like. Further, the program can be provided via a wired or wireless transmission medium such as a local area network, the Internet and digital satellite broadcasting.

In the computer 200, programs can be installed in the storage unit 208 via the input/output interface 205, by mounting the removable medium 211 on the drive 210. Further, the program can be received by the communication unit 209 via a wired or wireless transmission medium and can be installed in the storage unit 208. Alternatively, the program can be installed in the ROM 202 or the storage unit 208, in advance.

Note that the program executed by the computer 200 may be a program in which processes are implemented in time series in the order described in the present description, or a program in which processes are implemented in parallel or at the time when the implementation is required such as when a call has been made.

Further, the effects described in the present description are merely illustrative and are not intended to be limited, and thus there may be other effects.

Note that embodiments of the present disclosure is not intended to be limited to the embodiments described above, and various modifications are possible without departing from the scope of the present disclosure.

For example, the method of estimating the point spread function is not limited to the technique of blind deconvolution described in Non-Patent Document 1, as long as it is a method in which estimation error is caused by a repetitive pattern.

The present disclosure can be a configuration of a cloud computing in which one function is shared by a plurality of devices via a network and is processed jointly.

Also, each step described in reference with the above-mentioned flowchart can be performed while being shared by a plurality of devices in addition to being executed by one device.

Further, when a single step contains more than one process, the plurality of processes included in the step can be performed while being shared by a plurality of devices in addition to being executed by one device.

Note that the present disclosure can also take the following configurations.

(1)
An image processing apparatus including:
an exclusion unit for excluding a repetitive pattern from an image;
an estimation unit for estimating a point spread function by using the image from which the repetitive pattern has been excluded by the exclusion unit.

(2)
The image processing apparatus according to (1), further including a detection unit for detecting the repetitive pattern from the image.

(3)
The image processing apparatus according to (2), further including a transform unit for performing, on the image, transformation corresponding to an area where a first-order base includes one edge,
wherein the detection unit detects the repetitive pattern on the basis of a result of transformation by the transform unit.

(4)
The image processing apparatus according to (3), wherein the transform unit performs the transformation on the image for each area for transformation obtained by dividing the image, and
the detection unit detects an area for transformation in which a ratio of a first-order component of a transformation matrix obtained from a result of the transformation by the transform unit is equal to or less than a threshold, as the repetitive pattern.

(5)
The image processing apparatus according to (4), wherein the estimation unit estimates the point spread function for each area for estimation obtained by dividing the image, and a size of the area for transformation is identical to a size of the point spread function.

(6)
The image processing apparatus according to any of (3) to (5), wherein the transformation is a discrete cosine transform.

(7)
The image processing apparatus according to any of (1) to (6), wherein the image is a restored image obtained by restoring the image before degradation from the image after the degradation.

(8)
The image processing apparatus according to (1), further including a detection unit for detecting the repetitive pattern from a restored image obtained by restoring the image before degradation from the image.

(9)
The image processing apparatus according to (8) further including a restoration unit for generating the restored image from the image by using the point spread function estimated by the estimation unit,
wherein the exclusion unit excludes the repetitive pattern from the restored image.

(10)
The image processing apparatus according to (9), wherein the restoration unit outputs the restored image when the restored image has converged.

(11)
The image processing apparatus according to (9), wherein the restoration unit repeats generation of the restored image a predetermined number of times.

(12)
The image processing apparatus according to (8), further including a restoration unit for generating the restored image from the image by using the point spread function estimated by the estimation unit.

(13)
The image processing apparatus according to (12), wherein the restoration unit outputs the restored image when the restored image has converged.

(14)
The image processing apparatus according to (12), wherein the restoration unit repeats generation of the restored image a predetermined number of times.

(15)
An image processing method of an image processing apparatus including:
excluding a repetitive pattern from an image,
estimating a point spread function by using the image from which the repetitive pattern has been excluded by processing of the step of excluding.

REFERENCE SIGNS LIST

10 image processing apparatus
12 transform unit
13 detection unit
14 exclusion unit
15 estimation unit
16 restoration unit
30 image processing apparatus
50 image processing apparatus
70 image processing apparatus

The invention claimed is:
1. An image processing method, comprising:
in an image processing apparatus:
detecting a repetitive pattern from an image;

applying a boundary process on a first area that includes the detected repetitive pattern; and estimating a point spread function on the image, from which the first area is excluded, and on which the boundary process is applied.

2. An image processing apparatus, comprising:

one or more processors; and at least one memory storing computer executable instructions that when executed by the one or more processors:
 (a) detect a repetitive pattern from an image;
 (b) apply a boundary process on a first area that includes the detected repetitive pattern; and
 (c) estimate a point spread function on the image, from which the first area is excluded, and on which the boundary process is applied.

3. The image processing apparatus according to claim 1, wherein the one or more processors are further configured to transform a second area on the image where a first-order base includes one edge, wherein the repetitive pattern is detected based on a result of the transformation.

4. The image processing apparatus according to claim 3, wherein the one or more processors are further configured to:

transform each area on the image that is obtained based on a division of the image, and detect a third area for transformation as the repetitive pattern in which a ratio of a first-order components of a transformation matrix is obtained from a result of the transformation, and wherein the ratio is equal to or less than a threshold.

5. The image processing apparatus according to claim 4, wherein the one or more processors are further configured to estimate the point spread function for each area that is obtained based on the division of the image, and wherein a size of each area for transformation is identical to a size of the point spread function.

6. The image processing apparatus according to claim 3, wherein the transformation is a discrete cosine transform.

7. The image processing apparatus according to claim 1, wherein the image is a restored image obtained from a degraded image.

8. The image processing apparatus according to claim 1, wherein the one or more processors are further configured to detect the repetitive pattern from a restored image from a degraded version of the image.

9. The image processing apparatus according to claim 8, wherein the one or more processors are further configured to generate the restored image from the image based on the estimated point spread function.

10. The image processing apparatus according to claim 9, wherein the one or more processors are further configured to:

repeatedly apply the estimated point spread function to the image to obtain an intermediate restored image and apply (a), (b), and (c) of claim 1 to the intermediate restored image; and output the intermediate restored image as a final restored image when the intermediate restored image converges.

11. The image processing apparatus according to claim 9, wherein the one or more processors are further configured to repeat following operations a determined number of times:

apply the estimated point spread function to the image to obtain an intermediate restored image; and apply (a), (b), and (c) of claim 1 to the intermediate restored image.

12. An image processing apparatus, comprising:

one or more processors; and at least one memory storing computer executable instructions that when executed by the one or more processors:

transform each area on an image obtained based on a division of the image;

detect an area for transformation as a repetitive pattern in which a ratio of a first-order components of a transformation matrix is obtained from a result of the transformation, and wherein the ratio is equal to or less than a threshold;

exclude the repetitive pattern from the image; and estimate a point spread function on the image from which the repetitive pattern is excluded.

* * * * *